Jan. 6, 1959 T. MILLER 2,867,436

SPEED CONTROL

Filed July 1, 1955

INVENTOR.
THEODORE MILLER
BY
Christie, Parker & Hale
ATTORNEYS 2,867,436
Patented Jan. 6, 1959

2,867,436

SPEED CONTROL

Theodore Miller, Los Angeles, Calif., assignor, by mesne assignments, to Consolidated Electrodynamics Corporation, Pasadena, Calif., a corporation of California Application July 1, 1955, Serial No. 519,392

5 Claims. (Cl. 271—2.6)

This invention relates to speed controls and it has particular reference to controlling the transport speed in a drive system by varying the diameter of a drive member. The invention is especially useful for compensating for speed variations by controlling the diameter of a capstan drive member in magnetic tape recorders and the like.

Magnetic tape recorders for recording high precision data must be capable of maintaining constant tape velocity. Variations in bearing friction, driving torque, load conditions and capstan eccentricities in the magnetic tape drive system make it difficult to hold tape speed constant. To compensate for tape speed variations, it is common practice to incorporate a servo drive system in the recorder which senses tape speed variations and corrects for these speed changes by changing the angular velocity of the capstan drive member which drives the tape. Such servo systems are limited in frequency response and usually tend to be complex and expensive.

Conventional methods for overcoming the frequency limitation on such servo systems have been devised. Ordinarily these conventional methods involve additional tape speed control by use of one or more secondary servo-systems having low mechanical inertia and, while they are reasonably unlimited in frequency response, they are severely limited in the total amount of correction they can provide in any one direction. Therefore, these conventional methods must be used in addition with a highly sensitive servo drive system, the latter maintaining the average tape speed at a value so that the secondary servo-control may stay within its range of operation. Such combined control systems are expensive and have a tendency to hunt, i. e. to constantly undershoot and overshoot the proper amount of correction.

The present invention provides a means of compensating for tape speed variations which is reasonably unlimited in both its frequency response and also in its total range of correction. While the apparatus of the invention operates best in conjunction with a servo tape drive system, the latter need not be of the highly sensitive type and there is practically no tendency to hunt.

In accordance with the present invention a capstan drive member is fabricated to include at least one cylindrical-shaped layer of highly electro-strictive material such as barium titanate. Conductive means are disposed adjacent the inner and outer surfaces of the layer of electro-strictive material, and a tape speed error signal or voltage is applied to the conductive means. This causes the electro-strictive material of the drive member to expand or contract, depending upon the polarity of the error signal, and thus changes the diameter of the drive member which results in a proportional change of tape velocity.

The invention is explained in detail with reference to the drawings, in which.

Figure 1:
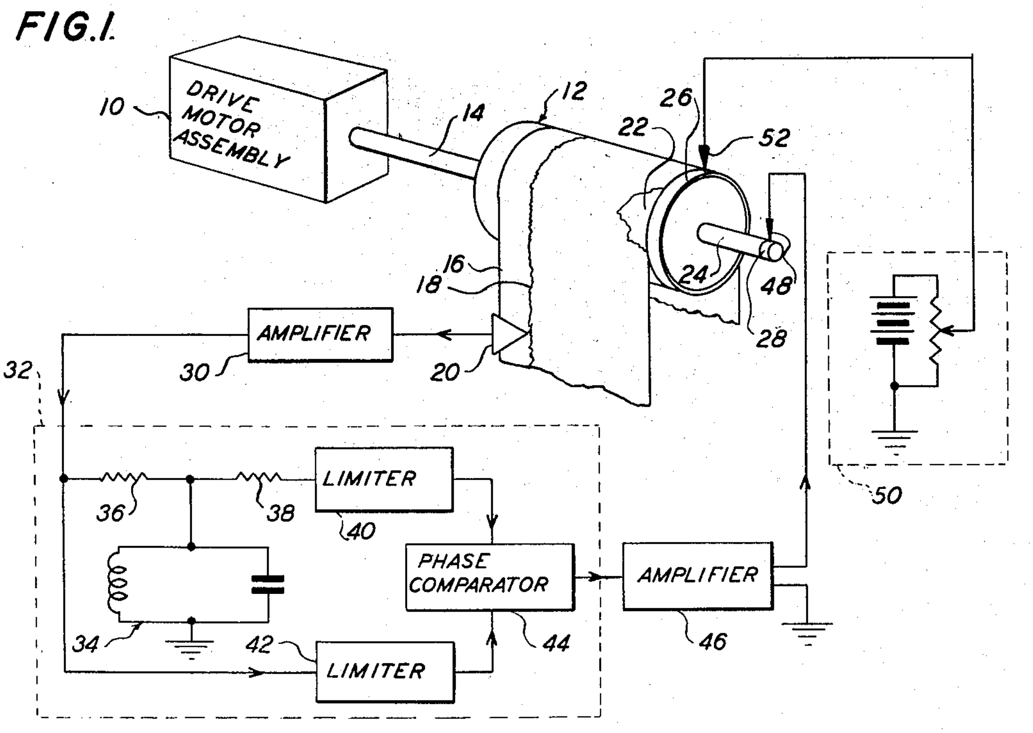
Fig. 1 is a schematic drawing of an embodiment of the invention.

Fig. 1 illustrates the essential features of the apparatus of the invention. A drive motor assembly 10 rotates a capstan 12 by a shaft 14. A magnetic tape 16 having a reference frequency 18 recorded on it winds around a portion of the periphery of the capstan and it is driven past a sensing head 20 by the capstan is accordance with the angular velocity derived from the drive motor assembly.

The capstan is fabricated from a highly electro-strictive material such as barium titanate. A gold metal film 22 is plated on the outside cylindrical surface of the drive member, and small diameter metal rod 24 is connected axially through the capstan. Exposed surfaces 26, 28 are provided for electrical connection to the gold film and metal rod, respectively.

A control potential or error signal applied between the outside gold surface and the inner rod will cause a radial expansion or contraction (depending upon the polarity) of the capstan drive member. This change in diameter will result in a proportional change of tape velocity, and by controlling the applied potential in accordance with tape speed errors, the tape speed is controlled to compensate for such tape speed errors.

When the magnetic tape is played, tape speed errors will appear as frequency variations in the recorded reference frequency sensed by the sensing head. The sensing head is connected through an amplifier 30 to a comparator circuit 32. The comparator circuit includes a resonant tuned circuit 34 which is tuned to the reference frequency originally recorded on the tape, resistors 36, 38, limiters 40, 42 and a phase comparator 44. The amplified "played-back" reference frequency is applied through the resonant tuned circuit 34, resistors 36, 38 and limiter 40 to one side of the phase comparator. The amplified "played-back" reference frequency is applied directly through limiter 42 to the other side of the phase comparator.

When the "played-back" frequency departs from resonance, a phase change will occur between the input and output signals of the resonant circuit. This phase change is sensed by the phase comparator which compares the "played-back" frequency applied through the resonant circuit and the limiter 40 with that directly applied through limiter 42. Thus, the phase comparator provides an output signal or error signal which is proportional to tape speed errors. The limiters 40, 42 serve to make the comparator circuit insensitive to amplitude fluctuations.

The error signal is applied from the phase comparator through an amplifier 46 and thence to the metal rod 24 of the capstan by a brush 48 which rides on the surface 28.

A bias means 50 is connected to the gold metal film 22 by a brush 52 which rides on the surface 26. The bias means provides an adjustable constant potential which maintains the electro-strictive material in its linear range. Thus, the error signal from the comparator circuit operates to vary the applied potential above or below the constant value provided by the bias means and in accordance with tape speed errors.

Figures 2, 3:
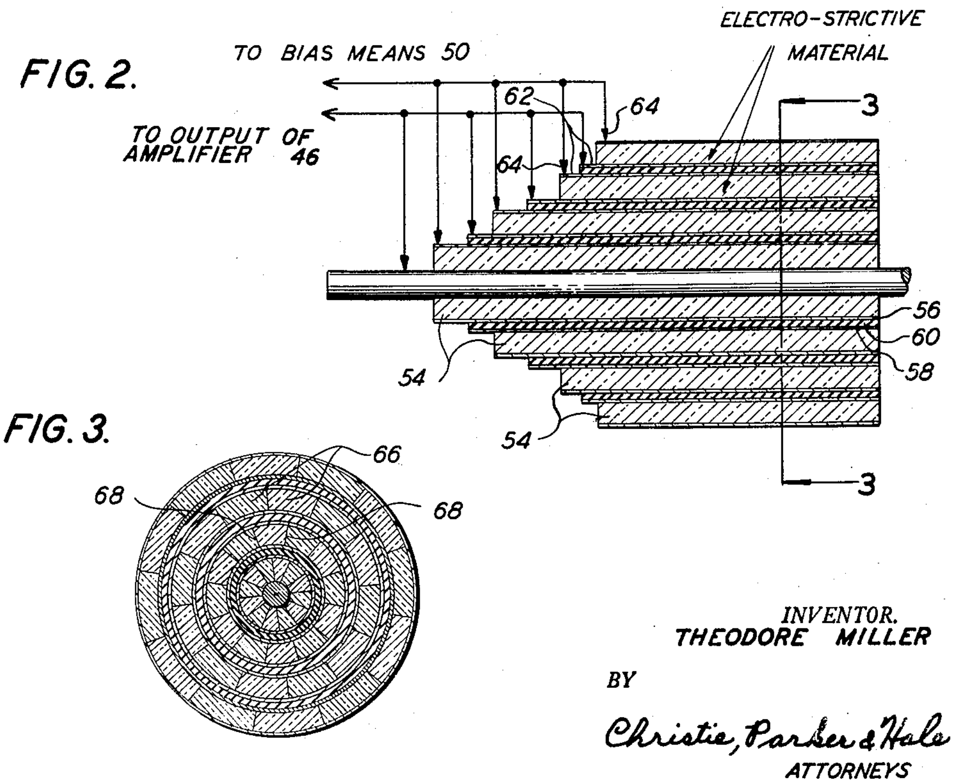
Fig. 2 is a schematic drawing of a preferred embodiment of the invention.
Fig. 3 is a view taken along line 3—3 of Fig. 2.

With refernce to Fig. 2, the capstan drive member may be made up of a plurality of cylindrical-shaped layers 54 of electro-strictive material. Between each successive layer of electro-strictive material, there are two layers of conductive material separated by a thin insulating layer, as shown at 56, 58 and 60, respectively. Each conductive layer has an exposed surface as shown at 62. Electrical potential is applied between the conductive layers disposed adjacent the inner and outer surfaces of each layer of electro-strictive material by way of a plurality of brushes 64 with each brush riding on an exposed surface such as shown at 62.

By utilizing the multi-layer construction of the preferred embodiment of the invention shown in Fig. 2, the magnitude of electrical potential necessary to cause a given change in the outside diameter of the capstan is appreciably reduced. Single crystals of barium titanate or other electro-strictive material large enough for a capstan drive member are difficult to obtain and expensive. As shown in Fig. 3, each of the cylindrical layers of electro-strictive material of Fig. 2 is constructed from a plurality of wedge-shaped crystals 66. Typically, the wedge-shaped crystals of each outer layer are centrally positioned with respect to the plane of separation between adjacent crystals in the next lower layer, typical planes of separation being as shown at 68. With this arrangement, the necessity of utilizing large crystals is overcome.

I claim:

1. Apparatus for controlling the speed of a tape comprising a rotatable member having at least one cylindrical-shaped layer of electro-strictive material extending around it, conductive means disposed adjacent the inner and outer surfaces of the layer of electro-strictive material, and means for deriving from the tape a tape-speed-error signal and applying the signal to the conductive means for controlling the outer diameter of the rotatable member to compensate for errors in the tape speed.

2. Apparatus for controlling the speed of a tape having a reference frequency signal recorded on it comprising a rotatable capstan for moving the tape, the capstan having at least one cylindrical-shaped layer of electro-strictive material extending around its outer periphery, means coupled to the capstan for rotating it at a substantially constant speed, and means responsive to the reference frequency signal for applying a voltage to the layer of electro-strictive material and thereby changing the diameter of the capstan to compensate for variations in the speed of the tape.

3. Apparatus for controlling the speed of a tape having a reference frequency signal recorded on it comprising a rotatable capstan for moving the tape, the capstan including a plurality of cylindrical-shaped layers of electro-strictive material and further including a plurality of separate electrically conductive layers with one separate conductive layer disposed adjacent the inner surface and one disposed adjacent the outer surface of each of the layers of electro-strictive material, means coupled to the capstan for rotating it at a substantially constant speed, and comparator means responsive to the reference frequency signal for applying a voltage to the conductive layers of the capstan and causing the layers of electro-strictive material to change size accordingly, thereby changing the outer diameter of the capstan and compensating for variations in the speed of the tape.

4. Apparatus in accordance with claim 3 wherein each of the cylindrical-shaped layers of electro-strictive material is composed of a plurality of wedge-shaped pieces of electro-strictive material, with each of the wedge-shaped pieces of each outer layer being centrally positioned with respect to the plane of separation between adjacent pieces in the next lower layer.

5. In a tape transport system which includes a rotatable member, means for rotating the member, and means on the outer periphery of the rotatable member for engaging the tape so that rotation of the member causes tape movement, the improvement which comprises at least one layer of electro-strictive material extending around and forming a part of the rotatable member, and means electrically coupled to the electro-strictive layer and operable to cause the electro-strictive layer to change its physical dimensions for controlling the effective diameter of the rotatable member while it is rotating, so as to effect a control of the speed of the tape.

References Cited in the file of this patent

UNITED STATES PATENTS

| | | |
|---|---|---|
| 2,596,494 | Lynch | May 13, 1952 |

FOREIGN PATENTS

| | | |
|---|---|---|
| 120,052 | Australia | June 21, 1945 |
| 684,234 | Great Britain | Dec. 17, 1952 |